(12) United States Patent
Nicolai

(10) Patent No.: US 6,409,122 B1
(45) Date of Patent: Jun. 25, 2002

(54) ANTI-SUBMARINE WARFARE UAV AND METHOD OF USE THEREOF

(75) Inventor: Leland M. Nicolai, Castaic, CA (US)

(73) Assignee: Lockheed Martin Corporation, Palmdale, CA (US)

( * ) Notice: Subject to any disclaimer, the term of this patent is extended or adjusted under 35 U.S.C. 154(b) by 0 days.

(21) Appl. No.: 09/761,076

(22) Filed: Jan. 17, 2001

(51) Int. Cl.7 .............................................. B64C 35/00
(52) U.S. Cl. ...................................... 244/106; 244/1 R
(58) Field of Search ................................ 244/105, 106, 244/137.3, 137.4, 138, 1 R, 13; 114/21.2, 312, 316, 317, 318

(56) References Cited

U.S. PATENT DOCUMENTS

| 5,097,267 | A | * | 3/1992 | Raviv | 244/3.14 |
|---|---|---|---|---|---|
| 5,372,337 | A | * | 12/1994 | Kress et al. | 244/52 |
| 5,415,365 | A | * | 5/1995 | Ratliff | 114/271 |
| 5,503,350 | A | * | 4/1996 | Foote | 244/1 R |
| 5,544,607 | A | * | 8/1996 | Rorabaugh et al. | 114/123 |
| 5,646,366 | A | * | 7/1997 | O'Connell | 114/21.2 |
| 5,831,856 | A | * | 11/1998 | Lin | 209/573 |
| 5,913,493 | A | * | 6/1999 | Labouchere | 244/105 |
| 5,915,650 | A | * | 6/1999 | Petrovich | 244/38 |
| 6,029,929 | A | * | 2/2000 | Blum et al. | 180/116 |
| 6,031,377 | A | * | 2/2000 | Watkins | 324/226 |
| 6,082,675 | A | * | 7/2000 | Woodall et al. | 244/120 |

* cited by examiner

Primary Examiner—Peter M. Poon
Assistant Examiner—Kevin Jakel
(74) Attorney, Agent, or Firm—Robert A. Schruhl

(57) ABSTRACT

An anti-submarine warfare system includes an unmanned "sea-sitting" aircraft housing submarine detecting equipment, the aircraft including a body portion having a catamaran configuration adapted for stably supporting the body portion when sitting in water, the body portion including a fuselage and laterally disposed sponsons connected to the fuselage via platforms, and submarine detecting equipment housed within the fuselage and adapted to be electronically linked to sonobuoys disposed in adjacent water locations.

9 Claims, 1 Drawing Sheet

ANTI-SUBMARINE WARFARE UAV AND METHOD OF USE THEREOF

BACKGROUND OF THE INVENTION

1. Field of the Invention

The present invention relates to unmanned airborne vehicles (UAVs), and more particularly to unmanned airborne vehicles designed for use in calm and rough seas while conducting anti-submarine detection exercises.

2. Description of the Related Art

Amphibious aircraft, both manned and unmanned, have been well known in the prior art. Typically, such aircraft have sponson structure allowing the craft to take off and land in water, as well as engine apparatus carried on the wing at a position substantially above the surface of the water so that neither the water or the spray interferes with the generation of propulsion by the engine apparatus.

It is also well-known to use sonar devices for the purpose of locating and identifying structures beneath the surface of water, and especially for the purpose of locating and identifying enemy or even hidden underwater vehicles or objects.

However, as yet, no one has combined the two concepts in a single, unmanned, propulsive device, such as an aircraft.

Against this background of known technology, the applicants have developed a novel system including an unmanned amphibious craft housing propulsive engines and armament, and being designed for deploying a plurality of sonobuoys, thereby creating a detecting field. The craft then sits on the water to monitor the readings generated by the field of sonobuoys, and if an enemy craft is detected, the anti-submarine armament is released and directed toward the enemy craft.

OBJECTS AND SUMMARY OF THE INVENTION

It is therefore a principal object of the present invention to provide a novel around-the-clock anti-submarine warfare (ASW) apparatus for providing coverage for a naval battle group using an unmanned airborne vehicle, while overcoming many of the disadvantages and drawbacks of similar submersible systems known in the art.

Another object of the present invention is to provide a novel ASW apparatus including a mobile craft capable of flight and an enemy locating and identifying capability deployable at predetermined positions so that naval battle groups can be protected.

Still another object of the invention is to provide an ASW system which includes an unmanned seaplane constituting a floating command station capable of deploying a network of submergible listening devices and then monitoring the network of listening devices in order to determine the possible presence of enemy craft, and in the event that such craft are detected, launching weapons capable of destroying such enemy craft.

Other objects, advantages and features of the invention will become more apparent, as will equivalent structures which are intended to be covered herein, with the teaching of the principles of the invention in connection with the disclosure of the preferred embodiments thereof in the specification, claims and drawings in which:

DETAILED DESCRIPTION OF THE INVENTION

Figure 1:
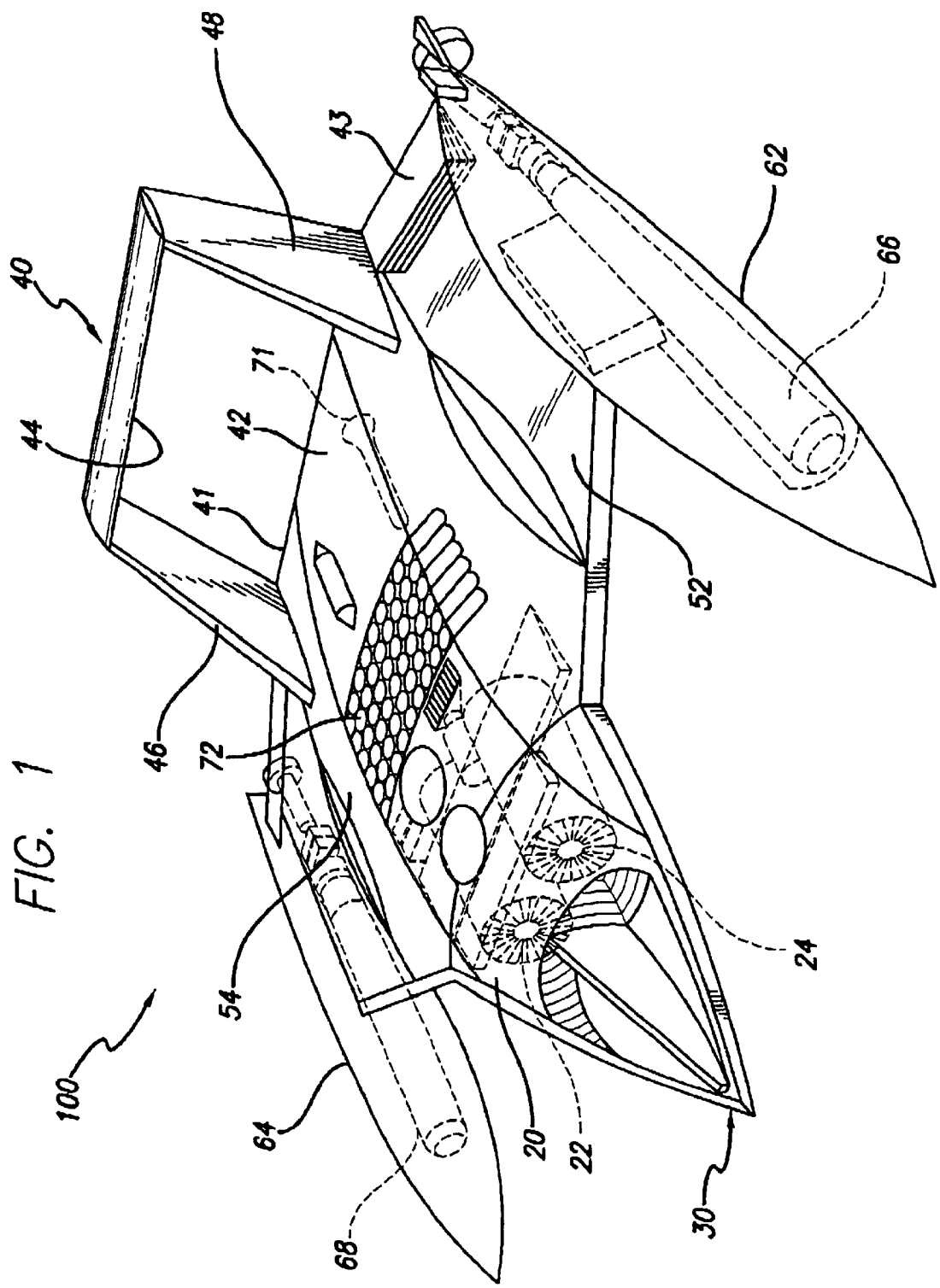
FIG. 1, the sole figure in the drawings, depicts the ASW unmanned airborne vehicle of the present invention.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an ASW unmanned airborne vehicle housing equipment adapted for detecting enemy craft and objects, while also carrying armament capable of destroying detected enemy craft and objects.

Unlike prior known systems, which deploy sonobuoys and then monitor their signals from a manned ASW aircraft flying overhead, the system of the present invention monitors the sonobuoys from an unmanned platform sitting quietly on the surface of the water.

Referring now to the sole FIGURE of the drawing, the UAV 100 is shown to feature a widely spaced catamaran configuration designed for stability in rough seas. The UAV as shown includes a fuselage 20 having a nose portion 30, a tail portion 40, lateral platforms 52, 54 and sponsons 62, 64 disposed outwardly of the lateral platforms and connected to the fuselage 20 by the lateral platforms 52, 54, respectively. During takeoff of the craft 100, the wing ailerons 43 and body flaps 41 would be fully deployed downward and, along with the sponsons, the design would provide a closed cell beneath the wing. Two propulsive devices located in the fuselage 20 would exhaust beneath the wing pressurizing the closed cell region to help lift the aircraft out of the water during take-off. This concept, called propulsion augmented ram (PAR), reduces the required thrust-to-weight for rough sea takeoff by a factor of 2.5, and helps balance the propulsion system for cruise operation.

The tail portion 40 includes a rear deck 42 extending rearwardly of the body portion 20 and a rear stabitizer 44 supported atop and connecting parallel, spaced apart, rudder structures 46, 48. The lateral platforms 52, 54 are substantially horizontally disposed. Torpedo bays 66, 68 are housed inside the sponsons and are arranged substantially in alignment with the longitudinal axis of the fuselage and are deployable upon detection of hostile or enemy submarines, related craft. and/or objects. The fuselage houses propulsion means, preferably dual turbo fan engines 22, 24 and includes intake inlets arranged forwardly of the propulsion means. The intake inlets are provided with covers (not shown) that close the inlets to keep water out of the engines when the craft is sitting in the water. It is contemplated that the engines would be shut down and the inlet covers closed prior to landing in the water. The fuselage is also designed to house such ASW equipment as one or more dipping sonar devices, an IR sensor, a low light level television, multi-mode radar, a towed magnetic anomaly detector 71, and sonobuoys 72.

In operation, the aircraft 100 would be assigned to and controlled from a host ship in a naval battle group. The aircraft would be deployed from the host ship, either by hoisting the aircraft onto the water or by a VTOL mechanism, such as tilt rotors. The aircraft would cruise out 100–300 nautical miles (nm) ahead of the battle group or to some predetermined site or location in accordance with a mission plan. When the aircraft reaches its target coordinates, it would deploy a sonobuoy pattern and then land in the water, whereupon it would lower its own hydrophone and water environment sensor, and raise an RF antenna via a balloon (for communicating with sonobuoys).

After sensing the water environment (e.g., temperature profile, salinity, pressure, etc.), the aircraft would instruct the sonobuoys to lower their hydrophones to optimum depths. The aircraft world be able to move around quietly about the sonobuoy field on battery power at about 4 knots, sensing the water environment and providing sonobuoy field refinement. The aircraft is designed to move about at a higher speed using the onboard APU, but would generate noise that could be detected by submerged (perhaps enemy) submarines It is contemplated that the aircraft 100 will sit and listen for about 4 hours (equivalent to conventional battery life of sonobuoys or longer as battery and/or energy cells or systems become more efficient) while the battle group moves ahead. Equipment in the aircraft 100 will provide a datalink connection with the host ship in the battle group via SATCOM. It is further contemplated that the aircraft 100 will be autonomous during its mission, all the while however, the remote control operator on board the host ship would be monitoring the course of events and have override command capabilities.

The aircraft 100 would then take off and move ahead another 100 nm or to some other predetermined site or location, deploy a second set of sonobuoys, land in the water and repeat the monitoring for another 4 hours. The on board batteries would be recharged during the flight, and during the day from solar panels (not shown) located on the upper surface of the aircraft body and horizontal tail.

By employing the apparatus of the present invention, many advantages are realized over manned airborne ASW systems. First, fewer ASW platforms are required to provide around-the-clock ASW for the battle group (a "sea-sitting" UAV offers much longer time-on-station than a manned airborne ASW craft). Second, significantly less fuel, maintenance and manpower costs are required. Third, the unmanned ASW aircraft sitting quietly in the water while monitoring sonobuoys is not detectable by nearby submerged submarines (the manned aircraft flying overhead is detectable by submerged submarines). Fourth, A human crew is not at risk during the ASW operation. Fifth, a "sea-sitting" ASW aircraft can continually monitor the sea environment and instruct the sonobuoys to adjust their hydrophones for the optimum depth.

Those skilled in the art will appreciate that various adoptions and modifications of the invention as described above can be configured without departing from the scope and spirit of the invention. Therefore, it is to be understood that, within the scope of the appended claims, the invention may be practiced other than as specifically described herein.

What is claim is:

1. An unmanned anti-submarine warfare aircraft, comprising:

a body portion having a catamaran configuration adapted for stably supporting said body portion when sitting in water, said body portion including a fuselage and laterally disposed sponsons connected to said fuselage via platforms, said sponsons being deployable from said fuselage while said aircraft is airborne over a predetermined target location, said sponsons being further deployable from said fuselage while said aircraft is sitting in the water, and submarine detecting equipment housed within said fuselage and adapted to be linked to sonobuoys disposed in adjacent water locations.

2. The aircraft of claim 1, wherein said fuselage further includes propulsion apparatus housed therein, and said sponsons each house torpedo tubes for launching torpedo armament when an enemy submarine or other object is detected.

3. The aircraft of claim 2, wherein power for said detecting equipment is derived from solar collecting devices supported by said fuselage or said laterally extending platforms.

4. The aircraft of claim 3, wherein power for said detecting equipment is derived from on board APU and batteries.

5. The aircraft of claim 2, wherein said armament may be deployed upon command from a host ship or aircraft.

6. The aircraft of claim 2, wherein said detecting equipment may be deployed, activated or deactivated by command from a host ship.

7. The aircraft of claim 2, wherein said aircraft may autonomously activate and deactivate said armament and said detecting equipment.

8. An anti-submarine warfare system, comprising: a host ship having a manned control center, unmanned aircraft housing submarine detecting equipment, said aircraft capable of flying ahead of said host ship to a predetermined location where detection functions are to be performed by said aircraft, and armament deployable from said unmanned aircraft upon detection of enemy submarines or enemy objects.

9. An anti-submarine warfare system, comprising: an unmanned sea sitting aircraft housing submarine detecting equipment, said aircraft including a body portion having a catamaran configuration adapted for stably supporting said body portion when sitting in water, said body portion including a fuselage and laterally disposed sponsons connected to said fuselage via platforms, and submarine detecting equipment housed within said fuselage and adapted to be electronically linked to sonobuoys disposed in adjacent water locations.

* * * * *